US008130677B2

(12) United States Patent
Barker et al.

(10) Patent No.: US 8,130,677 B2
(45) Date of Patent: Mar. 6, 2012

(54) METHOD AND SYSTEM FOR CONFIGURING A NETWORK COMMUNICATIONS DEVICE

(75) Inventors: Iain William Barker, Cambridge, MA (US); Stanley Chmielecki, Nashua, NH (US); Paulo Francisco, Woodbridge, CA (US); Paul Kieran Lynch, Somerville, MA (US); Gareth William John Owen, Somerville, MA (US); Michael Raymond Shearer, Cambridge, MA (US)

(73) Assignee: Aastra Technologies Limited, Concord (CA)

( * ) Notice: Subject to any disclaimer, the term of this patent is extended or adjusted under 35 U.S.C. 154(b) by 243 days.

(21) Appl. No.: 12/403,395

(22) Filed: Mar. 13, 2009

(65) Prior Publication Data

US 2009/0252063 A1    Oct. 8, 2009

Related U.S. Application Data

(60) Provisional application No. 61/036,486, filed on Mar. 14, 2008.

(51) Int. Cl.
*H04L 12/28* (2006.01)
(52) U.S. Cl. ......... 370/255; 709/220; 709/221; 709/222
(58) Field of Classification Search ........................ None
See application file for complete search history.

(56) References Cited

U.S. PATENT DOCUMENTS

| | | | | |
|---|---|---|---|---|
| 6,778,525 | B1* | 8/2004 | Baum et al. | 370/351 |
| 7,802,247 | B1* | 9/2010 | Weathersby et al. | 717/174 |
| 8,001,420 | B2* | 8/2011 | Tenenti | 714/15 |
| 2002/0044567 | A1* | 4/2002 | Voit et al. | 370/467 |
| 2002/0080939 | A1* | 6/2002 | Schlossman et al. | 379/117 |
| 2003/0083882 | A1* | 5/2003 | Schemers, III et al. | 704/270.1 |
| 2003/0225764 | A1* | 12/2003 | Smith et al. | 707/9 |
| 2005/0114665 | A1* | 5/2005 | Shim et al. | 713/171 |
| 2006/0050862 | A1* | 3/2006 | Shen et al. | 379/219 |
| 2006/0187900 | A1* | 8/2006 | Akbar | 370/352 |
| 2006/0242598 | A1* | 10/2006 | Marascio et al. | 715/810 |
| 2006/0262915 | A1* | 11/2006 | Marascio et al. | 379/201.01 |
| 2007/0211878 | A1* | 9/2007 | Cadiz et al. | 379/219 |
| 2007/0217434 | A1* | 9/2007 | Welbourn | 370/401 |
| 2008/0130639 | A1* | 6/2008 | Costa-Requena et al. | 370/389 |
| 2008/0130844 | A1* | 6/2008 | Hubbard et al. | 379/93.02 |
| 2008/0195761 | A1* | 8/2008 | Jabri et al. | 709/250 |
| 2008/0208605 | A1* | 8/2008 | Sinha et al. | 705/1 |
| 2008/0270597 | A1* | 10/2008 | Tenenti | 709/224 |
| 2009/0217163 | A1* | 8/2009 | Jaroker | 715/700 |

OTHER PUBLICATIONS

Int'l Search Report of PCT/US2009/037037.
Written Opinion of PCT/US2009/037037.

* cited by examiner

*Primary Examiner* — Ayaz Sheikh
*Assistant Examiner* — Peter Chau
(74) *Attorney, Agent, or Firm* — Dowell & Dowell, P.C.

(57) ABSTRACT

A method and system for auto-provisioning communications devices, the system includes a network appliance associated with a software and/or hardware module with instructions for managing the automatic configuration of communications devices.

12 Claims, 9 Drawing Sheets

```
# sample vnx.cfg file

[platform]
ip=x.x.x.x              #static IP
netmask=x.x.x.x         #netmask

[daemon]
language=EN-US
country=US
timezone=EST

[common]
sip proxy ip=10.50.20.15
sip proxy port=5060

[00085D3009B]
sip line1 auth name=9785556548
sip line1 password=y9sd$829*823
sip line1 display name= Joe Blogg

[00085E3029B]
sip line1 auth name=9785556530
sip line1 password=opw9^89*cd3i
sip line1 display name= YoYo Ma
```

Figure 11

METHOD AND SYSTEM FOR CONFIGURING A NETWORK COMMUNICATIONS DEVICE

BACKGROUND OF THE INVENTION

1. Field of the Invention

The present invention relates to digital networks, and more particularly it relates to dynamically configuring a device within a digital network.

2. Description of the Related Art

IP Telephony (VoIP) is a converged voice/data technology that uses the data network to carry voice (telephone) traffic, and is rapidly revolutionizing the world of enterprise communications. Some benefits of IP telephony include the ability to manage individual phone systems, and access to a plethora of features and applications, such as unified messaging, improved reliability and performance, and substantial cost savings.

Another key benefit of VoIP technology is that it allows networks to be built using either a centralized or a distributed architecture. In general, centralized architectures are associated with H.248 and MGCP. These protocols were designed for a centralized device called a media gateway controller or call agent that handles switching logic and call control. The centralized device communicates with the media gateways, which route and transmit the audio/media portion of the voice calls. In centralized architectures, the network intelligence is centralized and endpoints are relatively dumb with limited or no native features. Distributed architectures are associated with H.323 and SIP protocols. These protocols allow network intelligence to be distributed between endpoints and call-control devices. Intelligence in this instance refers to call state, calling features, call routing, configuring, billing, or any other aspect of call handling. The endpoints can be VoIP gateways, IP phones, media servers, or any device that can initiate and/or terminate a VoIP call. The call-control devices are called gatekeepers in an H.323 network, and proxy or redirect servers in a SIP network.

One significant difference between a POTS network and a VoIP network is that some architectures and intelligent subscriber gateways and/or IP phones now reside on the customer premises. These devices are more complex and often need to be configured before use, unlike a POTS phone. Typically, an end point must be configured, managed and maintained individually, this process includes manually entering the configuration settings for the device, such as the service provider's configuration server address or other network settings.

Generally, an installation process conducted by an end-user is often unsuccessful, as a certain level of knowledge of networking is assumed. The frustrated end-user ends up requesting technical support from the service provider. As such, the service provider is faced with higher costs associated with support, customer care, operation, and upgrades. These costs are significant and can dramatically impact its profitability. Also, slower deployment leads to fewer subscriptions, lost market share, decreased ARPU, and customer churn.

It is thus an object of the present invention to mitigate or obviate at least one of the above-mentioned disadvantages.

SUMMARY OF THE INVENTION

In one of its aspects, the present invention provides a system for automatic provisioning of communications devices, such as IP phones, within a network. The system includes a network appliance associated with software and/or hardware module with instructions for managing the automatic configuration of communications devices. The module also manages a centralized database of the system data and propagates it to other system components, such as, the network appliance, as required; populate and/or generate HTML and XML templates with dynamic data, and manages the general health of the system and takes appropriate action when critical system failures occur.

In another aspect of the invention, a network appliance is included in each of at least two interconnected LANs, such that the network appliances act in concert as a federated network, effectively providing call handling features without the need of a centralised PBX. The network appliance is an IP PBX which provides typical PBX/Key system features and functionality while leveraging a host of IP-based services, such as, auto discovering and self provisioning of extensions, visual voicemail delivered via XML, SIP trunking, expanded user control via a web GUI, remote teleworker and the ability to network multiple network appliances via IP. Designed to be compatible with select IP phones, an exemplary network appliance also supports at least one PSTN FXO trunk, at least one FXS Analog port and at least one SIP trunk, including at least one external paging port and at least one music input port.

Advantageously, the software and/or hardware module takes the onus off the user with respect to provisioning devices, and substantially reduces overhead of managing a network appliance by removing any end-user configuration.

BRIEF DESCRIPTION OF THE DRAWINGS

Several preferred embodiments of the present invention will now be described, by way of example only, with reference to the appended drawings in which:

FIG. 11 depicts an exemplary configuration file for a gateway.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. Such functional blocks may be realized by any number of hardware and/or software components configured to perform to specified functions. For example, the present invention may employ various integrated circuit components (e.g. memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

Figure 1:
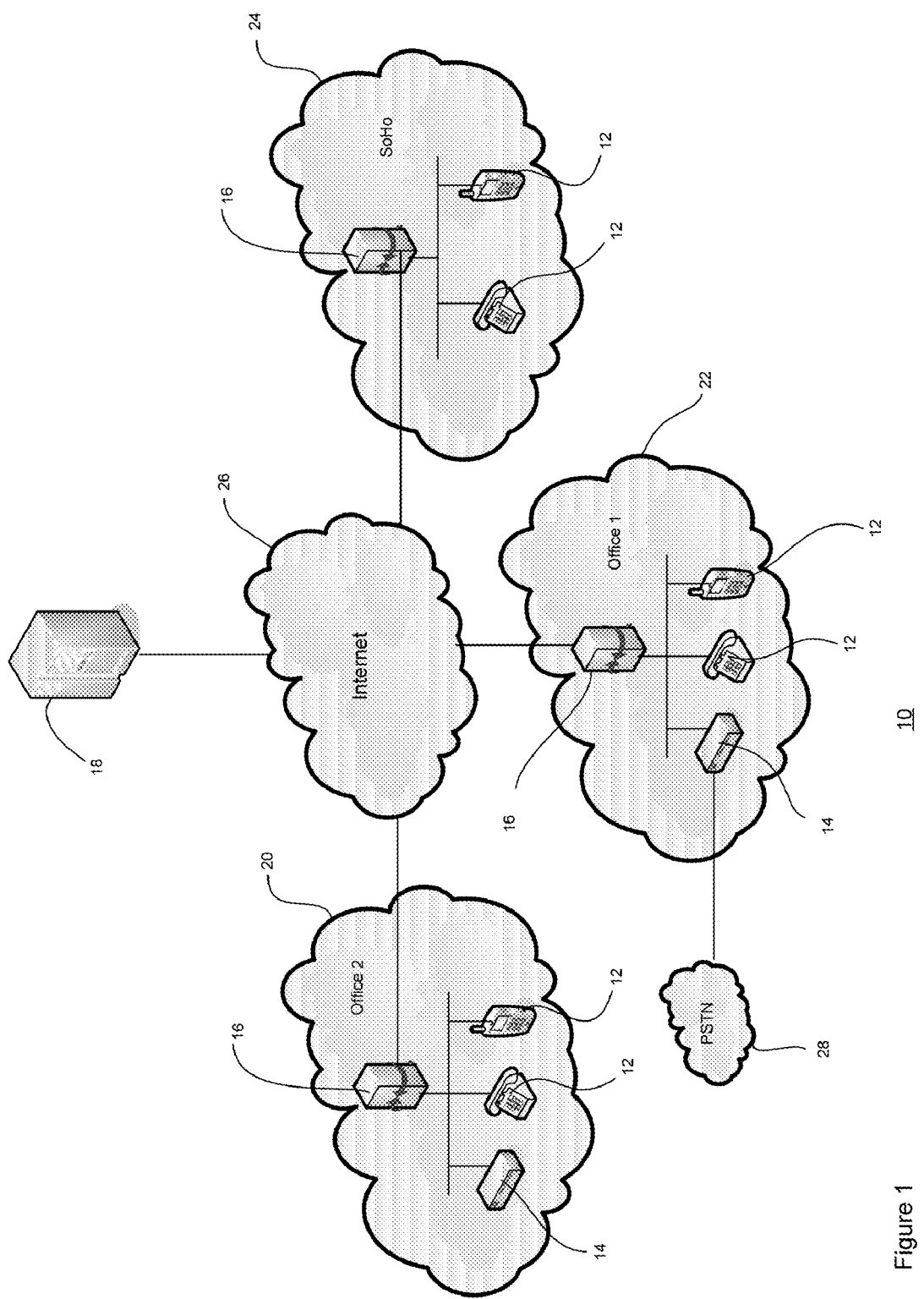
FIG. 1 depicts a communication system, in an exemplary embodiment.

FIG. 1 is a schematic representation of a communications system 10 for configuring a communications device 12 to transmit and receive information via packet switching based on the Internet Protocol (IP). The system 10 includes a network appliance 14 coupled to a central router 16, and connects to a SIP trunk gateway 18 via a communications network 22. It should be understood that the communications network 22 may consist of a plurality of LANs, or enterprise networks, such as central networks 20, 22, and remote network 24, such as a SoHo, with a remote router 17, or the Internet 26. The router 16 in office 1 transfers data between a local area network 20, 22 into the wide area network 26. The public internet is one example of a wide area network 26. Effectively, each LAN 20, 22, or 24, becomes a private network region, and uses the services of a local router 16 or 17 to access devices 12 or 14 or other devices located either in the wide area network 26, or within other remote LANs.

The network appliance 14 provides a plurality of PBX/Key System features and functionality, including IP-based services. As will be described below, the network appliance 14 enables faster provisioning of devices 12 within enterprise networks 20, 22, than prior art methods. By having a network appliance 14 within an enterprise network 20 or 22, devices 12 are enabled by simply plugging into the LAN 20 or 22, and the auto-configuration process ensues.

Therefore, to ensure appropriate security against interference from the public network 26, preferably, the router 16 or 17 is a firewall configured to execute Network Address Translation (NAT), which allows multiple hosts on each of the private networks 20, 22, or 24 to access the Internet 26 via a single external IP address, thereby obfuscating the topology of the private LAN 20, 22 or 24. The central router 16 and the remote router 17 are each associated with an externally-visible IP address. Generally, for large enterprises the externally-visible IP address for the router 16 or 17 is static; however, some networks 20, 22, or 24 are configured wherein the externally-visible IP address of the router 16 or 17 is dynamic. Each network router 16 or 17 may also have an associated host name that can be used with the Domain Name System (DNS) to translate the name into an IP address.

Turning now to the communications device 12, which includes a housing enclosing a dielectric substrate, such as a conventional printed circuit board (PCB). The PCB includes a processor (controller or logic means), a machine-readable medium, RF circuitry including a transceiver, auxiliary I/O device ports, and an antenna coupled to the transceiver, audio/speech circuitry, and a power source including associated circuitry. The machine-readable medium generally includes both volatile memory (e.g. RAM) and non-volatile memory (e.g. ROM, Flash Memory, or the like). One or more application programs may be loaded into memory and run on an operating system (OS). Examples of application programs include phone dialer programs, email programs, browser programs, user ringer tone selection programs, and so forth. The power source may be implemented as one or more batteries, however, the power source might further include an external power source, such as an AC adapter or a powered docking cradle that supplements or recharges the batteries. The phone 12 includes input/output devices, such as, a display or a touch-screen, a keypad/keyboard or buttons, including programmable keys, or soft keys, a microphone and a loudspeaker, or other input devices, to form a man-machine interface.

An exemplary network appliance 14 includes a housing enclosing a printed circuit board (PCB), with a processor (controller or logic means), a machine-readable medium, I/O device ports, local network transceiver, and a power source including associated circuitry. The machine-readable medium generally includes both volatile memory and non-volatile memory. One or more application programs may be loaded into memory and run on an operating system (OS). The network appliance 14 may also include other interfacing circuitry such as PSTN line ports, telephone line ports or other wide-area communication ports.

In more detail, the network appliance 14 is a Linux-based hardware that hosts an Open Source Software Private Branch Exchange (PBX), from Digium, Ala., USA. The network appliance 14 acts as a private telephone network (or PBX) within an enterprise network 20, 22. As will be described later, among its features, the network appliance 14 includes a plurality of FXO ports, capable of operating in any jurisdiction, or country, without modification of the hardware, a plurality of FXS ports, designed to accommodate fax machines and/or analog phones. As an example, one port may be used as a lifeline in case of power failure, in which case this port is switched directly through to one of the FXO ports by a relay. The second port is simply a regular FXS port, with no lifeline capability, while other ports may be used for a conference phone, an entry phone or a fax machine. Users connected to the network appliance 14 can direct dial internal extensions via the VoIP network, or share a number of outside lines for making telephone calls external to the network appliance 14. The network appliance 14 also includes a plurality of 10/100 Ethernet ports for a LAN or WAN connections.

The network appliance 14 may optionally use the services provided by a SIP trunk gateway 18 which routes call signaling and speech traffic between one or more communications devices 12 each located within their private local area network 20 or 22. Although the SIP trunk gateway 18 is typically the central point of exchange of all call signaling traffic across the wide area network 26, the SIP trunk gateway 18 may direct the communications devices 12 to transmit speech traffic directly to each other, by means of information contained in the signaling traffic. More commonly, the SIP trunk gateway 18 may be used to provide off-network access between the wide area network 26 and other networks not directly routable, for example domestic or international telephone networks, or other private communication systems, which may include traditional private branch exchanges (PBX) or public switched telephone network central offices (PSTN CO).

Configuration of the network appliance 14 may include settings for time and geographical location. The network appliance 14 may be configured in a number of methods, such as, multicast DNS, in which a user can access an initial set-up via a browser by entering an appropriate URI. The network appliance 14 may also advertise its presence on the communications network 22 via multicast DNS (mDNS), which allows clients that have mDNS support to automatically resolve the IP address of the network appliance 14 by entering the hostname. Other methods include UPnP "description" advertisement, or a proprietary service. Advantageously, these mechanisms allow an administrator or an end-user to access the management web page of the network appliance 14 without the inconvenience of attempting to find the IP address or the fully qualified domain name of the network appliance 14.

For the desired functionality, or first time use within the system 10, the phone 12 typically needs to be provisioned by inputting particular settings relating to the communications network 20, 22, or 24 and/or user preferences. In this exemplary embodiment, the network appliance 14 is initially provided with a set of configuration templates, defaults of which are appropriate for each model of communications device 12. The system administrator may optionally modify the default templates to customise for local network and/or user preferences. As will be described later, the network appliance 14 automatically performs the configuration of the phone 12, by processing the templated configurations using instructions implemented in a software and/or hardware module 30 of the network appliance 14.

The communications device 12 in the central network 22 uses the private IP address (or host name) of the network appliance 14 when communicating on the local area network 22. Generally, private IP addressing is not used on the public network 26, therefore the NAT function of the router/firewall 16 is used to translate between the private IP address used on the local area network 20, 22, or 24 and the appropriate public IP address used on the wide area network 26. The router 16 typically maintains an address table used to perform the mapping between the internal IP address and external IP address, and may include finer granularity mapping based on the concept of single or ranges of IP ports associated with each IP address. Each device 12 or 14 on the private local network 20, 22, or 24 may therefore be associated with a unique subset of the IP ports from the range available on the wide area network side of the router 16, with the router 16 performing network address translation and port-forwarding between the two IP networks 22 and 26 to which the device 12 or 14 is connected. NAT port mapping associations may be permanently assigned via manual provisioning, or temporarily assigned on-demand by devices connected on the local area network 22. For temporary mappings, a protocol such as the Universal Plug'n'Play protocol ("UPnP") may be used to automate the port reservation and mapping process.

The configuration of the communication device 12, such as an IP phone 12, in network 22, will now be described, as an example. Prior to the configuration of the phone 12, the network appliance 14 initiates a process to determine whether any other network entities are present within the network 22 or system 10. As an example, the network appliance 14 uses a discovery protocol to discover the central router 16 and its external IP address using UPnP, which in addition to providing NAT port-forwarding control described previously, also allows for the automated identification and cooperation of various network devices on the same network 22. Alternatively, the network appliance 14 and central router 16 may be configured manually. During auto discovery the network appliance 14 directs the central router 16 to map various Transport Control Protocol (TCP) ports and/or User Datagram Protocol (UDP) ports to services running on the network appliance 14. These mappings allow the network appliance 14 to access the wide area network 26 through the central router 16, and optionally to communicate with various services or programs running on the public remote devices such as SIP trunk gateway 18. In the case of a communication device 12 connected to a remote SoHo local area network 24, for which there is no local gateway, the UPnP discovery and port-forward mapping process is performed between the device 12 and the router 17.

Therefore, the phone 12 may operate in the absence of the local network UPnP and mDNS discovery, instead being separately or directly provisioned without adversely affecting the operation of the network appliance 14, as described above. Also, instead of entire virtual configuration files being remotely provisioned from a user provisioning and management software, the network appliance 14 may provide just an incremental or fragmentary portions of the required configuration, via XML or other remote provisioning method, with the remaining portions not related to network appliance 14 interoperability separately or directly provisioned on the communication device 12. In this way, the communication device 12 on the remote SoHo network 24 may communicate to the network appliance 14 on the remote office1 local area network 22, by making use of the TCP and UDP ports forwarded at the office1 router 16. In the reverse direction, the network appliance 14 on the officer local area network 22 may communicate to the communication device 12 on the remote SoHo network 24 by making use of the ports forwarded at the SoHo router 17. In this way, both devices 12 and 14 may communicate bi-directionally via their respective local routers 16. At least one port mapping is created on the office 1 router 16 to allow each communications device 12 to obtain configuration files from the network appliance 14, and a port mapping is created on router 16 and router 17 to allow the Session Initiation Protocol ("SIP") for Voice over IP call signaling control. Additional port mappings will be created at each router 16 or 17 as required to permit Real-time Transport Protocol (RTP) to be established for delivering video and audio data streams.

As stated above, the module 30 is associated with the network appliance 14 and manages the automatic configuration of communications devices 12. In an exemplary embodiment, a user provisioning and management program 32 is included with the software and/or hardware module 30, and runs on the Linux based hardware platform, such as, the proprietary VNX platform from Aastra Technologies Limited, Canada. The user provisioning and management program 32 substantially reduces the overhead of managing the Open Source IP PBX, such as Asterisk, by removing any end-user configuration, at least for a basic set-up. The module 30 also manages a centralized database for the network appliance 14 data and propagates the data to other network entities 12, 14, 16, 17 or 18 within the system 10 when required; populate and/or generate HTML and XML templates with dynamic data, and manage the general health of the system and take appropriate action when critical system failures occur.

Figure 2:
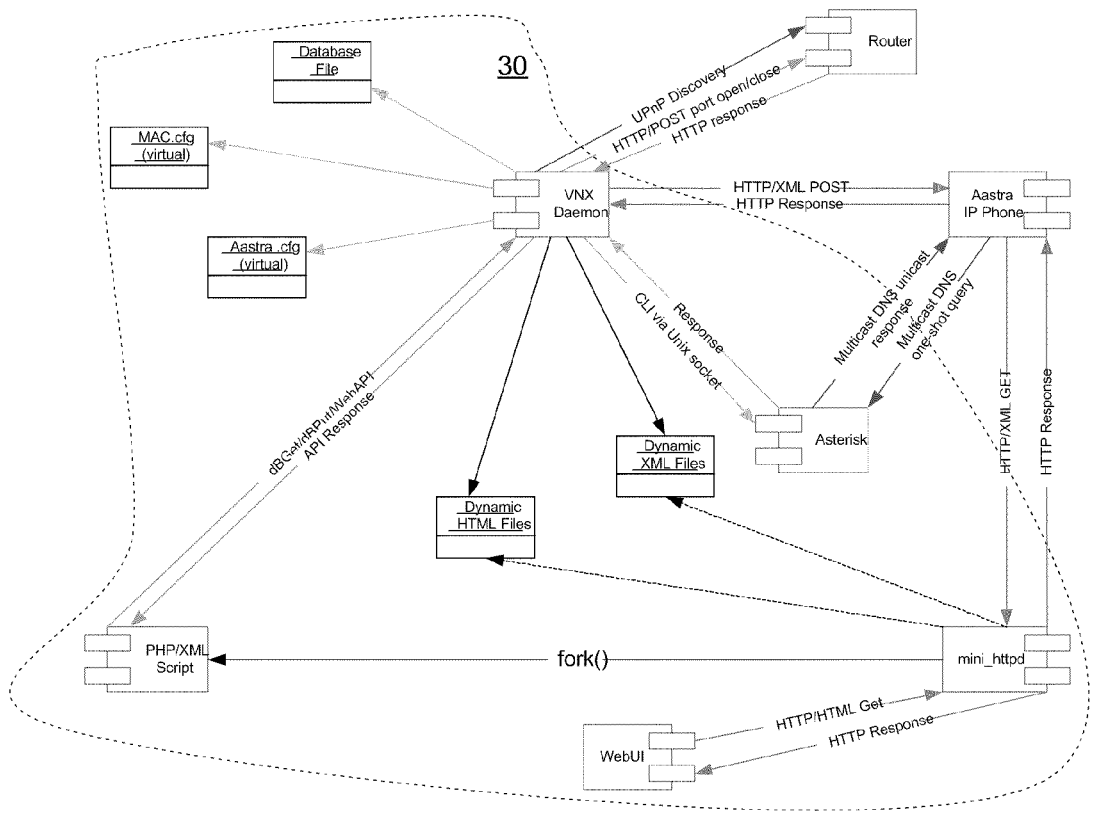
FIG. 2 depicts a dataflow diagram for a user provisioning and management software module.

In more detail, the user provisioning and management program 32 is a computer program, implemented with any programming or scripting language, such as C++, and preferably without complex inter-process communication requiring a framework, such as daemon. In an exemplary embodiment, the daemon 32 includes a combination of a binary, PHP/XML scripts and HTML pages. The binary portion of the daemon 32 comprises multiple subsystems or building blocks that manage various inputs and outputs from internal and external sources, such as, an HTTPS client to manage XML posts to the phones 12. Such building blocks of an exemplary daemon 32 comprise: a VNX interface manager to manage asynchronous calls from PHP scripts; a UPnP manager to manage UPnP discovery; an IP PBX proxy, such as an Asterisk Proxy, to allow the network appliance 14 to manage the execution of IP PBX commands (Asterisk CLI commands) using the AGI interface; a database manager for managing any reads/writes to the internal database and also the generation of phone 12 configuration data; a backup and restore manager which allows the network appliance 14 to reconstruct all of the configuration files in the system using the main VNX configuration file. When requested by the phones 12, the daemon 32 dynamically generates the configuration files, which are "virtual" in the sense that they do not persistently exist. Such files include config.php?MAC, where MAC corresponds to the MAC address of the phone 12, or the mac.cfg and aastra.cfg files. A dataflow diagram for the daemon 32 is shown in FIG. 2.

Figure 3:
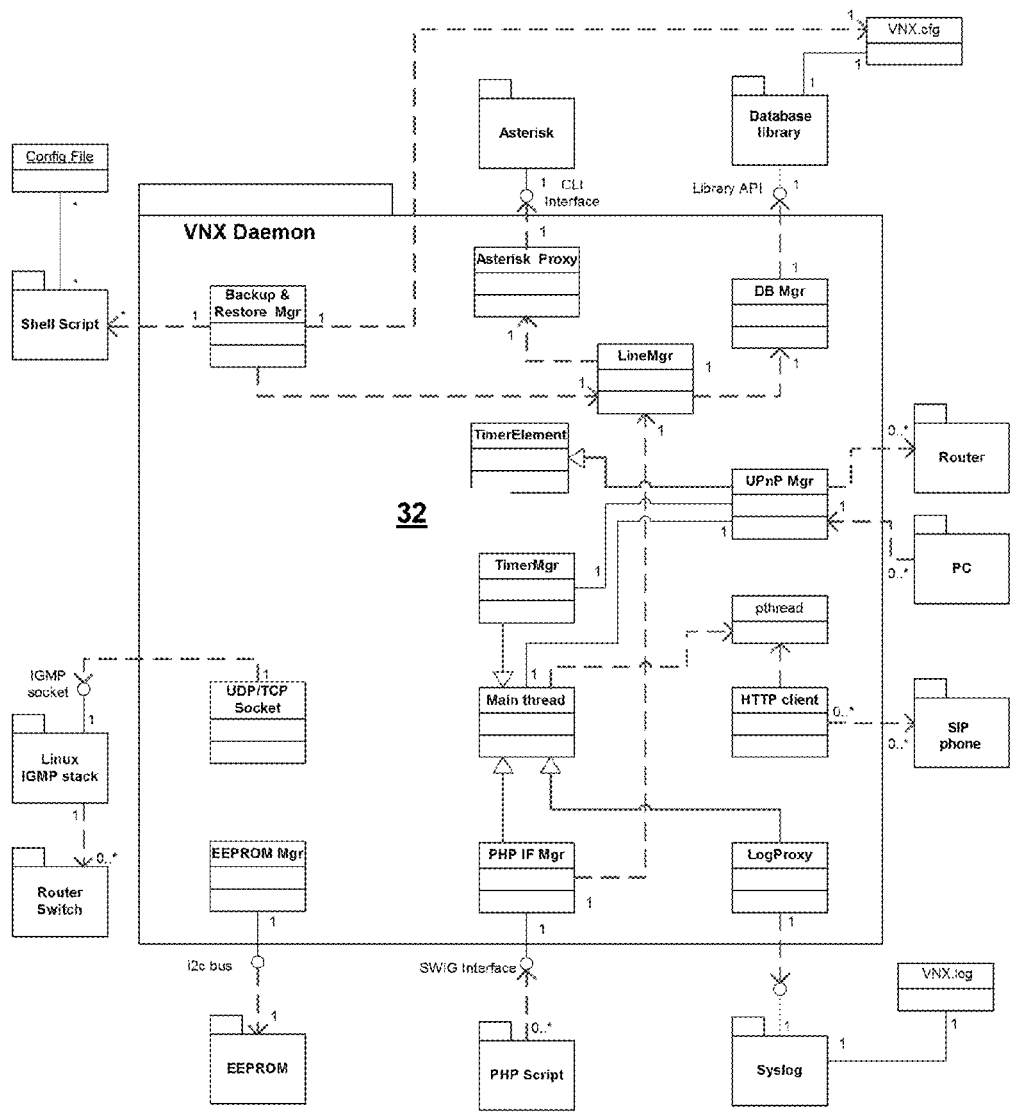
FIG. 3 depicts a UML representation of the software module of FIG. 2.

The daemon 32 is multithreaded when communicating to outside components that are associated to asynchronous events. Additionally, the timer manager, the logger and the HTTPS client are also multithreaded to improve general performance. Typically, a new HTTPS client thread is started for each POST, and all other events in the system are handled using the timer manager. An exemplary UML representation of the daemon 32 is shown in FIG. 3.

Exemplary steps for a method for auto-provisioning a phone 12 in a network environment 22 of system 10 include having the phone 12 acquire the address of the network appliance 14, when the phone 12 is first connected to the communications network 22. Generally, the phone 12 uses multicast DNS protocol by sending out a one-shot query, specifying the search target "vnx.local", corresponding to the network appliance 14, and waiting for any network appliance 14 in the communications network 22 to respond. Any network appliance 14 capable of providing the phone 12 configuration service reply with a multicast response having the resource record of the network appliance 14.

The phone 12 then uses a predefined path to get its configuration files using an HTTPS GET request from a configuration server, such as network appliance 14. If the phone 12 receives multiple responses to the mDNS query, the user is presented with a choice of network appliances 14 to choose from. Should the phone 12 be unable to discover a network appliance 14 using the method described above, then the user is prompted to enter the fully qualified domain name of the network appliance 14, or its corresponding IP address.

After the phone 12 has obtained the IP address of the network appliance 14 via multicast DNS, the phone 12 requests the configuration files. Alternatively, the end-user may manually enter the hostname or IP of the network appliance 14. If the phone 12 has never registered to the network appliance 14, then the network appliance 14 generates a MAC.cfg file from a template file with default options and assigns the phone 12 a free extension number. If the extension already exists, no further action is taken. The configuration files, firmware files, or updates, such as firmware.st and aastra.cfg files, are subsequently loaded into the computer readable medium of the phone 12, after which the phone 12 is ready. As stated above, the 'virtual' files (mac.cfg and aastra.cfg) are generated dynamically by the provisioning software (vnx daemon) when requested by the phones 12.

Figure 4:
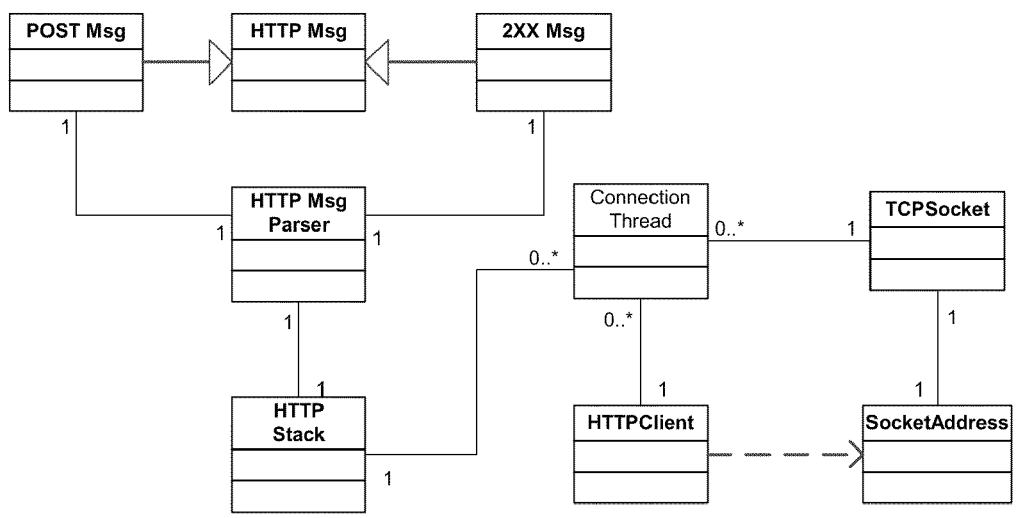
FIG. 4 depicts an exemplary HTTPS Client UML diagram.
Figure 5:
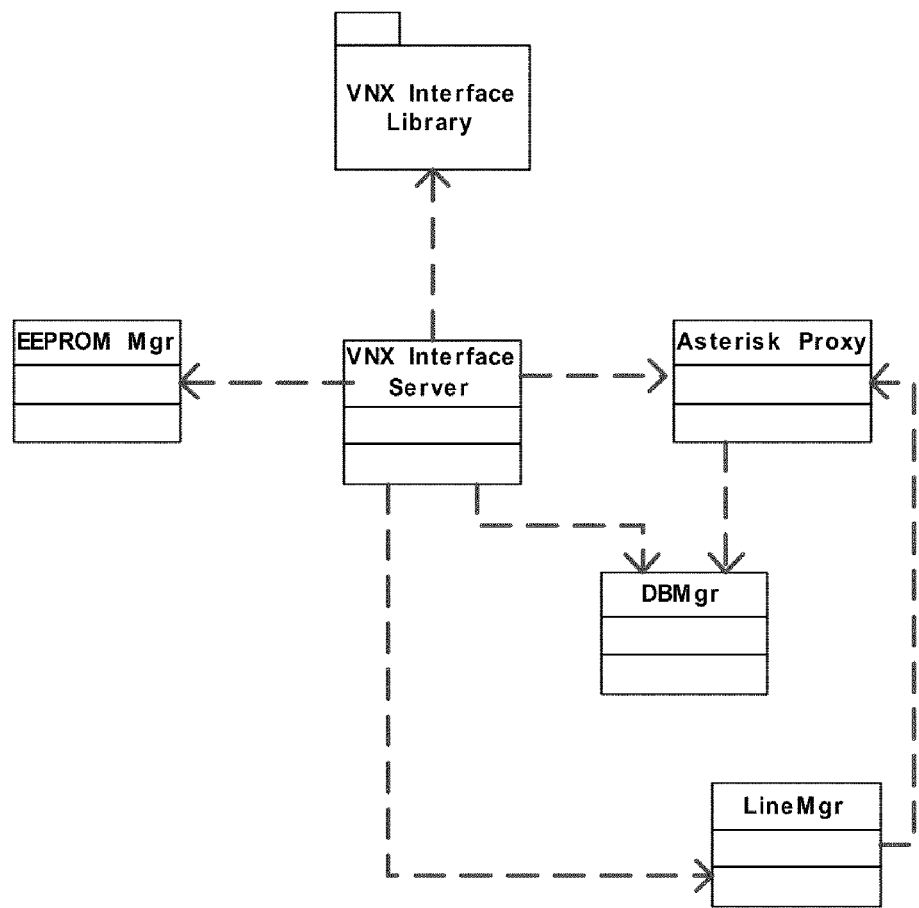
FIG. 5 depicts an exemplary VNX Interface manager UML diagram.

The various building blocks of the daemon 32 will now be described in detail. The HTTPS client on the network appliance 14 is used to push XML scripts to the phones 12. Every time a POST is executed, a new thread is spawned to handle the 200 OK or the retries in case of a failure. The threads are created detached so that once the final message is received and the connection is closed, the resources are immediately freed. FIG. 4 shows an exemplary HTTPS Client UML diagram. The VNX interface server manages asynchronous calls from PHP scripts. Each public primitive defined in the interface includes a C++ implementation and a PHP wrapper equivalent automatically generated, such as, a vnx_interface.php file. These primitives can be called directly from the PHP script by means of a dynamically loadable module, such as, the php_vnx_interface.so library, which is automatically loaded. Also, since the VNX interface server implementation is a singleton, no private data from individual connections is allowed. Any primitives that require user data to continue processing are done as part of a servant implementation, such as, the line interface which allows primitives that modify phone features to be processed in another class that is allocated by the VNX interface. After the client disconnects, this class is automatically destroyed. FIG. 5 shows an exemplary VNX Interface manager UML diagram.

Figure 6:
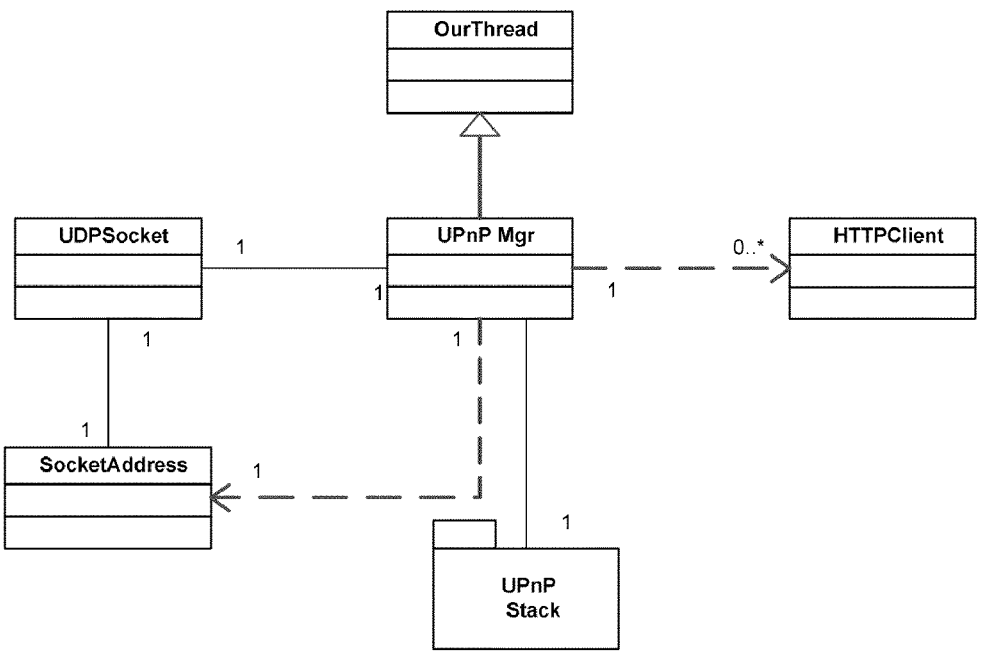
FIG. 6 depicts an exemplary UPnP Manager UML diagram.

The UPnP manager allows the daemon 32 to perform tasks, such as, allowing the user to automatically forward ports from the router 16 or 17 to the network appliance 14, performing a control action on the router or firewall 16 or 17 that allow the daemon 32 to forward or cancel port forwarding, or allowing users to broadcast UPnP description and presentation messages to the network 22. The daemon 32 also refreshes the port forwarding on a regular basis in order to keep those ports opened on the network appliance 14, and also monitors the network appliance 14 for any failures and re-opens them if necessary. The UPnP manager class also handles UPnP discovery requests from clients that have an UPnP client. FIG. 6 shows an exemplary UPnP Manager UML diagram.

Figure 7:
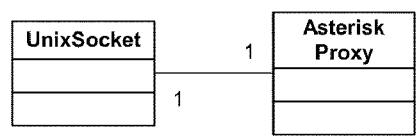
FIG. 7 depicts an exemplary Asterisk Proxy UML diagram.

The Asterisk proxy allows the daemon 32 to communicate with the network appliance 14 for the purpose of accessing or modifying the database, getting status information or issuing management commands. Every command that is available from the Asterisk command line is accessible from the interface. This class replicates what an Asterisk Gateway Interface (AGI) usually does but with some enhancements. The AGI is an interface for adding functionality to Asterisk with many different programming languages, such as Perl, PHP, C, Pascal, Bourne Shell. The AGI interface is only available for scripts that have been called from an extension. Therefore, the data may be accessed from within the daemon 32. Typically, the Asterisk CLI is accessed via a Unix socket, and the Asterisk CLI is accessed using "asterisk-rc" or "rasterisk". These two commands merely open a PF_LOCAL socket to Asterisk, send the command then wait for a response. In order to make this more efficient, the Asterisk Proxy simply replicates the mechanism used in those commands. FIG. 7 shows an Asterisk Proxy UML diagram.

The database manager allows the user to add, modify or delete data from the /etc/vnx.cfg file. This file may be separated in four separate sections, the platform section, the daemon section, the common and the phone sections. The platform section contains data that is specific to 3rd party configuration files stored in the system. For example, the static IP address of the network appliance 14 or the /etc/ntp.conf file is buffered in the VNX database in case the system requires to be backed up or restored. The daemon 32 section may contain data specific to the daemon 32, such as, the language of the system, the country, line impedance information, and so forth. However, this data is used only by the daemon 32 and the WebUI. The common section is the phone data that is common to all the phones 12 in the system 10. This data is usually associated to the aastra.cfg file. Finally, each phone 12 includes its own section that may be identified by the MAC address. This section may include details of the call detail records for the phone 12, such as, the incoming and outgoing call lists. Data found under this section overrides any parameters that are in the common section.

Figure 8:
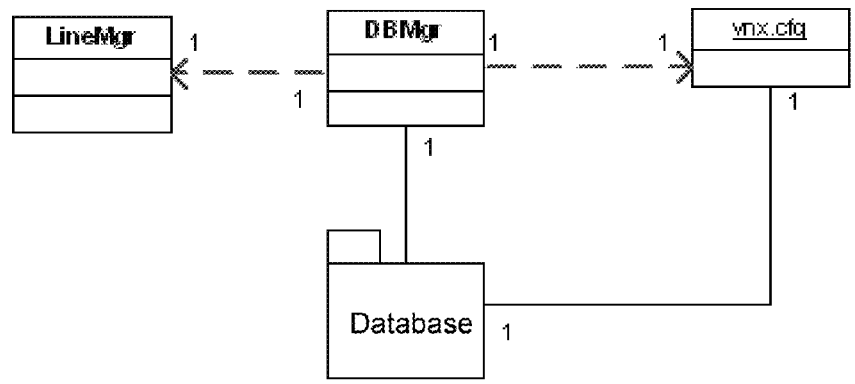
FIG. 8 depicts an exemplary Database Manager UML diagram.

In one example, the data is managed by a SQL database engine library, and the primary database is the /etc/vnx.cfg file, and each section is associated with a secondary database. The data may be accessed by specifying the section and the key which will in turn return a value. The network appliance 14 maintains a single database stored in a flat text file and managed using the SQL database engine library. This database contains the entire network appliance 14 configuration separated into four unique sections. Firstly, the platform specific configuration, which could include the static IP, address, the netmask, hostname, gateway, etc. Secondly, the daemon 32 specific parameters like language, country of origin, time zone, etc. Followed by the common phone parameters that differ from the defaults contained in the template. These are the parameters that are contained in the aastra.cfg file. Finally, subsequent sections include each of the phone 12 specific information that has been modified from the default configuration using the MAC address as a header to the section. FIG. 8 shows a Database Manager UML diagram.

The backup and restore manager is responsible for restoring the database file in the DbMgr, and updating all the 3rd party files in the system with the information contained in the database, such as the ntp.conf file to Asterisk specific configuration files. Phone specific data may be updated in Asterisk using the LineMgr.

As mentioned above, all of the data on the network appliance 14 may be stored in a single file, such as a flat text file, which allows the system to be readily backed up and restored. Most of the data in the database is self-contained and specific to the daemon 32, with the exception to the platform section. This section may contain data that needs to be propagated to other files in the system, since the network appliance 14 may be based on several open source binaries that use their own configuration files, for example, an NTP server would be store in /etc/ntp.conf.

Figure 9:
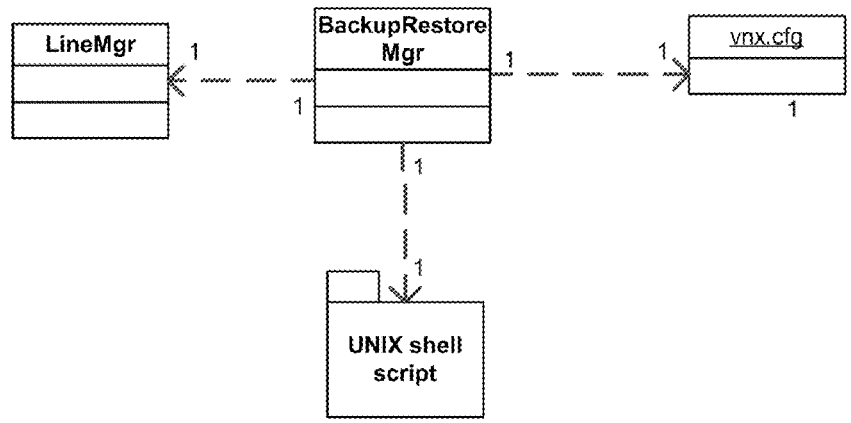
FIG. 9 depicts an exemplary Backup and Restore manager UML Diagram.

In order to restore the entire database binaries that have their own configuration files with data stored in the database file of the network appliance 14 includes a template file in the vanilla distribution. Whenever the values are changed via the GUI or whenever a restore is done, a parameter substitution is called to replace the template values with the new values. This action permits backup of a single file instead of several files located throughout the system. FIG. 9 shows a Backup and Restore manager UML diagram.

Additional security may be added to prevent phones 12 from being automatically registered, such as sending a message to the administrator when a phone 12 registers with a URL for authorization of the new extension, or by having a phone registration password that is configurable using the web interface. Additional administrator only phone XML or web interface driven scripts may also allow the administrator to remove or move an extension. Such scripts allow an administrator to 'out' a phone 12, for example when a desk is free and no extension is assigned or to 'swap' a phone from type to another. Both methods use a PHP wrapper that hooks into the daemon 32, similar to the command used to create a new extension. The modify command may also port the configuration of a phone 12 to another version and or another terminal type. PnP profiles are defined using XML templates, for example, the description for the network appliance 14 is based on the Basic Device 1.0 XML template. When the daemon 32 is started, it broadcasts this description with the presentation URL of the network appliance 14 to the user is using an operating system with support for an UPnP client.

In yet another embodiment, the daemon 32 has the provision for allowing 'find-me, follow-me' pairs of phone numbers to be associated. This a mechanism of coupling a primary extension supporting the mDNS discovery and provisioning methods described herein, to a secondary extension of generic nature which does not provide such mechanisms. Advantageously, when the primary phone 12 is discovered, a secondary set of configuration parameters on the network appliance 14 could be automatically created, such that the generic non-mDNS phone 12 could register with the network appliance 14 as a surrogate to the main line. In this way, auto-configuration is supported for phones 12 embodying the mDNS methods as described above, and the network appliance 14 would support phones 12 not implementing methods as described herein, as adjunct units to the primary phone 12. The UPnP and mDNS discovery and provisioning methods described with reference to the network appliance 14 are equally applicable for implementation on the phone 12.

Figure 10:
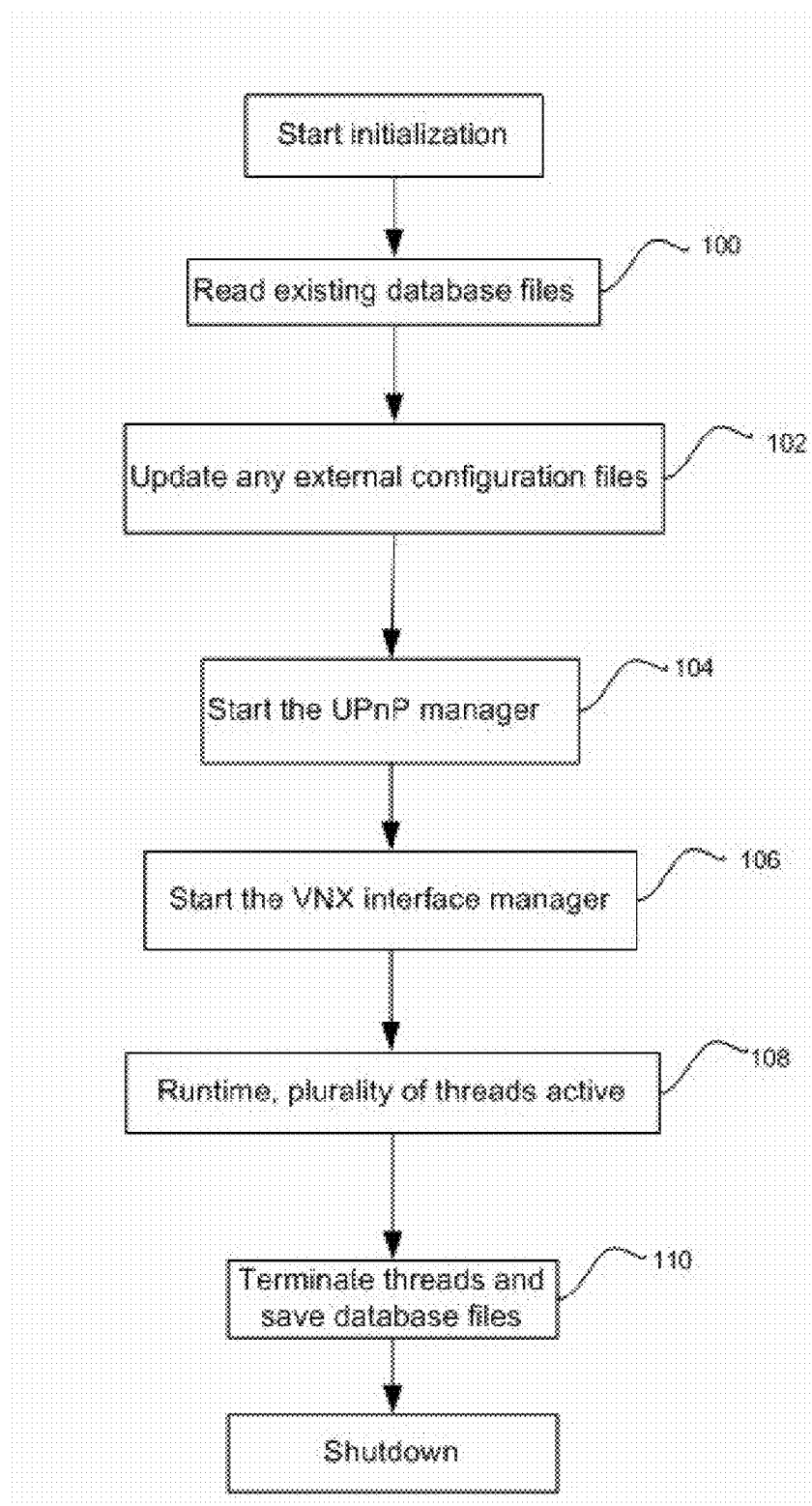
FIG. 10 depicts a flowchart of the software module in operation.

FIG. 10 shows a flowchart of a daemon 32 for auto-provisioning in operation. During the initialization process, the daemon 32 executes the following procedures upon startup: in step 100, the daemon 32 reads existing database files into memory, such as, the /etc/vnx/vnx.cfg database file; and updates to any external configuration files are performed using system calls to scripts that apply parameter substitution and system-specific customization of the original template configuration files, in step 102. The daemon 32 also starts the UPnP manager in order to forward the required HTTPS, SIP and RTP ports (the range of these being specified in the vnx.cfg database file) from the router 16 or 17 (if available) to the network appliance 14 (step 104), this also starts a thread that is responsive to the UPnP discovery requests for clients that support the UPnP client. In step 106, the VNX interface manager is started, which in turn starts a thread to process requests from PHP scripts using the VNX PHP API, the PHP scripts communicate to the network appliance 14 using a PHP to C++ wrapper generated.

Once the system has been initialized, the main application enters an endless loop until the program is terminated (step 108). A plurality of threads handle all of the communications to and from the daemon 32, such as a Timer Manager thread, a LogProxy thread, a HTTPS client thread(s), and a VNX interface manager thread. The config.php script calls a wrapper function that ties into the daemon 32 that allows it to automatically generate the default configuration of a phone extension. In both cases, the script returns the virtualized representation of a MAC.cfg file back to the phone 12, so that phone 12 can finish its bootstrap sequence.

If the phone 12 has never registered to the network appliance 14 before, the network appliance 14 sends an XML POST script to the phone 12 to prompt the user for certain details, such as, username, the preferred language, the time zone, and so forth. The daemon 32 is responsible for provisioning the Asterisk IP PBX with the required information using the Asterisk CLI interface. Such provisioning requires the following sub-steps: firstly, the daemon 32 populates the sip.conf file with the phone 12's configuration details. The username of the SIP extension corresponds to the extension number and the password is a hash derived from the MAC address and the serial number; secondly, the daemon 32 adds the phone's extension number in the extensions.conf file and any other extension specific features, and finally, the daemon 32 adds the extension in the voicemail.conf file with extension specific features. After successfully provisioning the phone 12, the daemon 32 triggers a reboot of the phone 12 using an XML primitive A graceful shutdown is executed when the daemon 32 receives specific signals, such as, SIGINT, SIGQUIT or SIGKILL (step 110). These signals direct the daemon 32 to mask off any new PHP requests, while processing the remaining requests, and terminate the VNX interface manager and the UPnP manager. Finally, the database files on the network appliance 14 are saved, such as, the /etc/vnx/vnx.cfg database file, and the application exits. An exemplary configuration file for a network appliance 14 is shown in FIG. 11.

In yet another exemplary embodiment, a method for provisioning a communication device 12 by a network appliance 14 includes the steps of:

providing a computer program to automatically tune FXO interfaces of the network appliance 14 with appropriate configuration parameters;

enabling an interface coupled to the computer program to accept user input and user feedback related to the FXO interfaces in order to tune the FXO interfaces in realtime.

In another exemplary embodiment, the network appliance 14 provides full PBX functionality, including:
- local SIP extensions, remote SIP users, SIP trunking;
- flexible voicemail;
- operator console;
- custom announcements;
- auto-attendant (AA) with day/night/holiday scheduling;
- interactive Voice Response (IVR) with directory number and name dialing;
- 3-way conference calls (3WC);
- busy lamp field monitoring (BLF);
- flexible call forwarding (CFB, CFNA, CFA);
- find-me, follow-me (FMFM);
- call park;
- call/ring groups;
- remote call pickup;
- barred numbers;
- custom speed-dial;
- a plurality of Foreign Exchange Office (FXO) ports for connection to analogue public telephone lines (PSTN). Each FXO is equipped with on-hook CallerID detection and full G.168 echo cancellation;
- universal Plug-and-Play (UPnP) integration for easy setup of gateway/router; and local network discovery from Microsoft Windows™ PCs.

The features/functionality of the network appliance 14 include:
- ability to generate call detail records (CDRs) for external billing applications;
- ability to store calling line ID (CLID) and calling name ID (CNID) in the missed calls and callers list;
- ability to network multiple network appliance 14 platforms across a LAN/WAN (identified by an IP address, public Internet name, or domain name service (DNS));
- providing a local dialing plan and the ability to define user dialing restrictions;
- offering "music on hold" feature via a port for external audio input that supports external music input or a custom .WAV file;
- providing an overhead paging port for connection to an amplifier;
- providing at least one dedicated Foreign Exchange Station (FXS) port for connection to a FAX machine;
- providing at least one dedicated FXS port for connection to an emergency analog phone in case of power failure;
- providing at least one input/output (I/O) port for relay output (activated by dialing an internal directory number (DIRN));
- provides at least one input connection that can trigger an event notification on the network appliance 14. A triggered event can be sent as an email, Extensible Markup Language (XML) message sent to the phone UI, or as a recorded prompt for voice notification;
- providing easy configuration using an administrator Web interface (Web UI); and
- ability for the administrator to backup/restore the network appliance 14 platform.

In another embodiment, the method for configuring the network appliance 14 entails coupling a phone 12 to the network 20, and using that phone 12 to configure the network appliance 14. After the completion of the phone 12 discovery process, the administrator is prompted to configure the network appliance 14. This option may also be selectable from the options menu of the phone 12, when the network appliance 14 is not configured, and this menu may be accessed using the normal default passwords. However, after the network appliance 14 has been configured, access to this menu is permitted only to the administrators group members.

The device 12 may be a multi-mode terminal, and thus may operate within a plurality of network environments 20, 22, 24 26. The device 12 may be fixed or mobile, and includes, but is not limited to, mobile phones, IP network entities, IP terminals, H.323 terminals, DECT terminals, SIP-DECT terminals, PDAs, digital cameras, PCs, MP3 players, soft phones, game consoles, ATAs, IPTVs, TVs, remote controls, projectors, set-top boxes, satellite-navigation systems, multimedia devices, network appliances, or any combination(s) thereof.

The communications network 20, 22, 24, or 26 can include a series of network nodes (e.g. the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The embodiments of the invention in which an exclusive property or privilege is claimed are defined as follows:

1. A method for automatic discovery and/or automatic provisioning of a communications device in a network environment, said communications device being coupled to a network appliance, the method having the steps of:

providing a program application executable to manage the automatic discovery and/or automatic provisioning of said communications device, said program application being a software and/or hardware module associated with the network appliance;

said program application executing instructions to read existing database configuration files and configuration templates in a computer readable medium associated with a database;

updating external configuration files using system calls to scripts that apply parameter substitution and system-specific customization of said configuration files and configuration templates;

starting a Universal Plug and Play (UPnP) manager to forward Hypertext Transfer Protocol Secure (HTTPS), Session Initiation Protocol (SIP) and Real-time Transport Protocol (RTP) ports as specified in said database;

starting a thread for responding to UPnP discovery requests; and starting an interface manager between said program application and said network appliance, which starts a thread for processing requests from Personal Home Page: Hypertext Preprocessor (PHP) scripts using a PHP Application Program Interface (API);

wherein said program application runs in an endless loop until said program application is terminated, and said program application having a plurality of threads to handle communication to and from said program application, said program application comprising:

a combination of a binary portion, PHP/ Extensible Markup Language (XML) scripts and HyperText Markup Language (HTML) pages, said binary portion comprising multiple subsystems for managing various inputs and outputs from internal and external sources; and wherein said multiple subsystems comprise:

an HTTPS client manager to manage XML posts to said communications device;

a virtual network computing interface manager to manage asynchronous calls from PHP scripts; a UPnP manager to manage UPnP discovery;

a network appliance proxy to allow said network appliance to manage the execution of network appliance commands using an Asterisk Gateway Interface (AGI) interface;

a database manager for managing any reads/writes to an internal database and generation configuration data for said communications device:

a backup and restore manager to allow reconstruction of configuration files.

2. The method of claim 1 wherein said program application further automatically tune Foreign Exchange Office (FXO) interfaces of said network appliance with appropriate configuration parameters;

enabling an interface coupled to said program application to accept user input and user feedback related to the FXO interfaces in order to tune the FXO interfaces in real-time.

3. The method of claim 1 wherein said communications device performs the configuration of said network appliance, by following the steps of: presenting an option to configure said network appliance on a display associated with said communications device; and entering appropriate network parameters.

4. The method of claim 1 wherein said program application allows coupling a primary extension supporting multicast Domain Name System (mDNS) discovery and other provisioning methods to a secondary extension of a generic nature having no such mechanisms.

5. The method of claim 4 wherein said mDNS discovery and other provisioning methods allow 'find-me, follow-me' pairs of communications device contact numbers to be associated, whereby when a primary communications device is discovered, a secondary set of configuration parameters on the network appliance is automatically created.

6. The method of claim 5 wherein a generic non-mDNS communications device is able register with the network appliance as a surrogate to a main line associated with said primary communications device, such that auto-configuration is supported for communications device embodying the mDNS discovery, and non-mDNS communications devices.

7. The method of claim 6 wherein said network appliance is an Internet Protocol Private Branch Exchange (IP PBX).

8. The method of claim 1 wherein said program application reduces the overhead of managing the network appliance by removing any end-user configuration.

9. The method of claim 1 wherein said computer-readable medium comprises a software and/or hardware module associated with an Internet Protocol Private Branch Exchange (IP PBX), wherein said software and/or hardware module includes instructions for auto discovering and self provisioning of extensions, visual voicemail delivered via Extensible Markup Language (XML), Session Initiation Protocol (SIP) trunking, expanded user control via a web Graphical User Interface (GUI), remote teleworker and the ability to network multiple network appliances via IP, and support for at least one Public Switched Telephone Network (PSTN) Foreign Exchange Office (FXO) trunk, at least one Foreign Exchange Station (FXS) analog port and at least one SIP trunk, including at least one external paging port and at least one music input port.

10. An Internet Protocol Private Branch Exchange (IP PBX) comprising:

a computer-readable medium having a program for automatic provisioning of a communications device in a network environment, said program being a software and/or hardware module associated with the IP PBX, said software and/or hardware module having:

a combination of a binary position, Personal Home Page: Hypertext Preprocessor (PHP)/ Extensible Markup Language (XML) scripts and HyperText Markup Language (HTML) pages, said binary portion comprising a plurality of sub-programs that manage various inputs and outputs from internal and external sources, said plurality of sub-programs including:
a Hypertext Transfer Protocol Secure (HTTPS) client to manage XML posts to said communications device,
an interface manager to manage asynchronous calls from said PHP scripts;
a Universal Plug and Play (UPnP) manager to manage UPnP discovery;
an IP PBX proxy to manage the execution of IP PBX commands using an Asterisk Gateway Interface (AGI) interface;
a database manager to manage any reads/writes to an internal database and also generation of communications device configuration data;
a backup and restore manager to allow reconstruction of configuration files using a main configuration file, file; and
wherein said software and/or hardware module includes instructions for auto discovering and self provisioning of extensions, visual voicemail delivered via XML, SIP trunking, expanded user control via a web Graphical User Interface (GUI), remote teleworker and the ability to network multiple communications devices via IP, and support for at least one Public Switched Telephone Network (PSTN) Foreign Exchange Office (FXO) trunk, at least one Foreign Exchange Station (FXS) analog port and at least one Session Initiation Protocol (SIP) trunk, including at least one external paging port and at least one music input port.

11. The IP PBX of claim 10 wherein said software and/or hardware module includes instructions for automatically tuning FXO interfaces of at least one network appliance with appropriate configuration parameters; and for enabling an interface coupled to said program to accept user input and user feedback related to the FXO interfaces in order to tune the FXO interfaces in real-time.

12. The IP PBX of claim 10 wherein said configuration data includes platform section comprising data specific to 3rd party configuration files, a daemon section comprising data specific to said software and/or hardware module, a common section comprising data that is common to all communication devices on said network, and individual communication device data identifiable by said communication device's Media Access Control (MAC) address.

* * * * *